(12) United States Patent
Awatsuji et al.

(10) Patent No.: US 9,201,397 B2
(45) Date of Patent: Dec. 1, 2015

(54) DIGITAL HOLOGRAPHY DEVICE AND IMAGE GENERATION METHOD USING DIGITAL HOLOGRAPHY

(75) Inventors: Yasuhiro Awatsuji, Kyoto (JP); Peng Xia, Kyoto (JP); Tatsuki Tahara, Kyoto (JP)

(73) Assignee: National University Corporation Kyoto Institute of Technology, Kyoto (JP)

( * ) Notice: Subject to any disclaimer, the term of this patent is extended or adjusted under 35 U.S.C. 154(b) by 254 days.

(21) Appl. No.: 13/980,201

(22) PCT Filed: Feb. 14, 2012

(86) PCT No.: PCT/JP2012/053436
§ 371 (c)(1),
(2), (4) Date: Jul. 17, 2013

(87) PCT Pub. No.: WO2012/114947
PCT Pub. Date: Aug. 30, 2012

(65) Prior Publication Data
US 2013/0301093 A1 Nov. 14, 2013

(30) Foreign Application Priority Data

Feb. 25, 2011 (JP) ................. 2011-040820

(51) Int. Cl.
*G03H 1/26* (2006.01)
*G03H 1/04* (2006.01)
*G01B 11/24* (2006.01)
*G03H 1/08* (2006.01)

(52) U.S. Cl.
CPC .............. *G03H 1/0443* (2013.01); *G01B 11/24* (2013.01); *G03H 1/0866* (2013.01); *G03H 2001/0458* (2013.01); *G03H 2222/31* (2013.01)

(58) Field of Classification Search
CPC .............. G02B 5/32; G02B 1/02; G03H 1/08; G03H 1/22; G03H 1/04; G03H 1/02; G03H 1/16; G03H 1/26; G01B 9/02; G01B 9/021; G03F 7/001; G06T 7/0075

USPC ............ 359/9–11, 16, 20, 22, 30, 32, 489.01, 359/29, 35; 356/364, 457, 458, 495; 430/1, 430/2; 382/154

See application file for complete search history.

(56) References Cited

U.S. PATENT DOCUMENTS

2010/0253986 A1   10/2010   Awatsuji et al.
2011/0292402 A1   12/2011   Awatsuji et al.

FOREIGN PATENT DOCUMENTS

JP       2005-283683 A   10/2005
JP       4294526 B2       7/2009

(Continued)

OTHER PUBLICATIONS

Peng Xia et al "Removing the Residual Zeroth-Order Diffraction Wave in Polarization-Based Parallel Phase-Shifting Digital Holography System", Applied Physics Express 4 (2011), 072501-1.*

(Continued)

*Primary Examiner* — Thomas K Pham
*Assistant Examiner* — Jie Lei
(74) *Attorney, Agent, or Firm* — Harness, Dickey & Pierce, P.L.C.

(57) ABSTRACT

A digital holography device (1) which is capable of measuring a subject with high accuracy by correcting intensity unevenness by accurately removing zeroth-order diffracted light, includes: a hologram generating section (26) for generating a first hologram and a second hologram each obtained by extracting components identical in phase shift amount from a polarizer array hologram which is recorded in an image capturing device (7) mounted with a polarizer array (6); a dividing section (3) for dividing the first hologram into a plurality of first regions, and dividing the second hologram into a plurality of second regions; a comparing section (4) for comparing a first average value of an intensity in a first region of the first hologram and a second average value of an intensity in a second region of the second hologram which region corresponds to the first region; and a correcting section (5) for, in a case where the first average value and the second average value differ, correcting at least one of the first average value and the second average value so that the first average value and the second average value are equal.

8 Claims, 8 Drawing Sheets

(56) References Cited

FOREIGN PATENT DOCUMENTS

WO   WO-2009/066771 A1   5/2009
WO   WO-2010/092739 A1   8/2010

OTHER PUBLICATIONS

International Search Report PCT/ISA/210 for PCT/JP2012/053436 dated Mar. 13, 2012.

Corrected International Search Report PCT/ISA/210 for PCT/JP2012/053436 dated Mar. 30, 2012.

Written Opinion PCT/ISA/237 for PCT/JP2012/053436 dated Mar. 13, 2012.

J.W.Goodman et al. "Digital image formation from electronically detected holograms", Applied Physics Letters, vol. 11, No. 3, p. 77-79 (1967).

I.Yamaguchi et al. "Phase-shifting digital holography", Optics Letters, vol. 22, No. 16, Aug. 15, 1997, p. 1268-1270.

* cited by examiner

DIGITAL HOLOGRAPHY DEVICE AND IMAGE GENERATION METHOD USING DIGITAL HOLOGRAPHY

TECHNICAL FIELD

First, one hologram which is recorded in each pixel of an image capturing device mounted with a polarizer array and includes two or more kinds of hologram information that differ in phase shift amount of a reference light beam is herein defined as a polarizer array hologram. The present invention relates to a digital holography device and an image generation method using digital holography in each of which a reconstructed image of a subject is generated in accordance with a first hologram and a second hologram each obtained by extracting components identical in phase shift amount from the polarizer array hologram.

BACKGROUND ART

A unit of a phase is hereinafter represented by a radian. As a processing technology becomes elaborated and diversified, sophisticated measurement and analysis of, for example, a three-dimensional shape of an object is required, and various measurement methods have been developed. Among such measurement methods, an interference measurement technique using light interference, especially digital holography allows non-destructive and non-contact obtainment of three-dimensional information on an object. Therefore, digital holography is one of the measurement methods which have recently gained attention.

Digital holography is a technique for reconstructing, by use of a computer, an image of a three-dimensional object in accordance with an interference pattern (interference fringe) obtained by light irradiation to the three-dimensional object. Specifically, for example, an interference pattern formed by an object light beam obtained by light irradiation to a three-dimensional object and a reference light beam coherent to the object light beam is recorded by use of an image capturing device such as a CCD (charge coupled device). In accordance with the interference pattern thus recorded, an image of the three-dimensional object is reconstructed by calculating diffraction by use of a computer.

Inventors of the present invention have proposed a digital holography device which has a configuration such that a polarizer array is provided, e.g., attached to an image capturing surface of a CCD camera, the polarizer array splitting light emitted from a light source into two kinds of reference light beams having different phases in a plane perpendicular to a direction in which the light travels, and which has improved an image quality of a reconstructed image of a subject by a single shot (see Patent Literature 1).

Further, the inventors of the present invention have proposed a digital holography device which is capable of obtaining highly-accurate three-dimensional information in a deep range at a moment of a single shot by including: a polarized light splitting section which splits an object light beam into two kinds of object light beams that are polarized in different directions, so as to cause a difference in angle between directions in which the two kinds of object light beams are transmitted; and a polarizer array section in which a plurality of first polarizer regions and a plurality of second polarizer regions are provided and which transmits a reference light beam and an object light beam that reaches the polarizer array section via a subject (see Patent Literature 2).

CITATION LIST

Patent Literatures

Patent Literature 1
International Publication No. WO/2009/066771 (Publication Date: May 28, 2009)
Patent Literature 2
International Publication No. WO/2010/092739 (Publication Date: Aug. 19, 2010)
Patent Literature 3
Specification of Japanese Patent No. 4294526

Non Patent Literatures

Non Patent Literature 1
J. W. Goodman and R. W. Lawrence, Appl. Phys. Lett. 11, p. 77 (1967)
Non Patent Literature 2
I. Yamaguchi and T. Zhang, Opt. Lett. 22, p. 1268 (1997)

SUMMARY OF INVENTION

Technical Problem

However, during mounting of a polarizer array on an image capturing surface of a CCD camera, an image capturing surface of a block of the polarizer array is directionally and positionally displaced with respect to a pixel of the image capturing surface, so that an assembly error occurs. The assembly error causes intensity unevenness in a hologram to be obtained by a digital holography device. Further, a change over time also causes such an intensity distribution (intensity unevenness). This causes a problem such that, in a case where an object light beam and a reference light beam are unequal in intensity on their respective transmission axes, unnecessary zeroth-order diffracted light cannot be perfectly removed during an image reconstruction process carried out by the digital holography device.

An object of the present invention is to provide a digital holography device which is capable of perfectly removing unnecessary zeroth-order diffracted light caused by an assembly error that occurs during mounting of a polarizer array on an image capturing surface of a CCD camera, and an image generation method using digital holography.

Solution to Problem

In order to attain the object, a digital holography device in accordance with the present invention includes: a hologram generating section for generating a first hologram and a second hologram each obtained by extracting components identical in phase shift amount of a reference light beam from a polarizer array hologram which is recorded in a pixel of an image capturing device mounted with a polarizer array and includes two or more kinds of hologram information that differ in the phase shift amount; a dividing section for dividing the first hologram into a plurality of first regions, and dividing the second hologram into a plurality of second regions in a second pattern identical to a first pattern in which the first hologram is divided into the plurality of first regions; a comparing section for comparing a first average value of an intensity in a first region of the first hologram and a second average value of an intensity in a second region of the second hologram which region corresponds to the first region; and a correcting section for, in a case where the first average value and the second average value differ, in order that an intensity of zeroth-order diffracted light is accurately removed, correcting at least one of the intensity in the first region of the first hologram and the intensity in the second region of the second hologram which region corresponds to the first region.

According to the feature, in a case where the first average value of the intensity in the first region of the first hologram and the second average value of the intensity in the second region of the second hologram which region corresponds to the first region differ, a ratio of zeroth-order diffracted light between the regions of each of the holograms can be 1:1, so that a subject can be measured with high accuracy in the entire surface of the image capturing device by correcting intensity unevenness by accurately removing zeroth-order diffracted light, which is an unnecessary image component.

An image generation method using digital holography in accordance with the present invention, includes the steps of: (a) generating a first hologram and a second hologram each obtained by extracting components identical in phase shift amount of a reference light beam from a polarizer array hologram which is recorded in a pixel of an image capturing device mounted with a polarizer array and includes two or more kinds of hologram information that differ in the phase shift amount; (b) dividing the first hologram into a plurality of first regions, and dividing the second hologram into a plurality of second regions in a second pattern identical to a first pattern in which the first hologram is divided into the plurality of first regions; (c) comparing a first average value of an intensity in a first region of the first hologram and a second average value of an intensity in a second region of the second hologram which region corresponds to the first region; and (d) in a case where the first average value and the second average value differ, in order that an intensity of zeroth-order diffracted light is accurately removed, correcting at least one of the intensity in the first region of the first hologram and the intensity in the second region of the second hologram which region corresponds to the first region.

Another digital holography device in accordance with the present invention includes: a hologram generating section for generating a first hologram and a second hologram each obtained by extracting components identical in phase shift amount of a reference light beam from a polarizer array hologram which is recorded in a pixel of an image capturing device mounted with a polarizer array and includes two or more kinds of hologram information that differ in the phase shift amount; a dividing section for dividing the first hologram into a plurality of first regions, and dividing the second hologram into a plurality of second regions in a second pattern identical to a first pattern in which the first hologram is divided into the plurality of first regions; a reconstructed image group generating section for generating a group of a plurality of reconstructed images by calculation under a phase shift method and diffraction integration in accordance with the first hologram and the second hologram while changing a correction value for an intensity in at least one of a first region of the first hologram and a second region of the second hologram; and a selecting section for selecting, from the group of the plurality of reconstructed images, a reconstructed image on which least zeroth-order diffracted light is superimposed, and finding the correction value for the reconstructed image thus selected.

Since the feature makes it possible to find a correction value for a reconstructed image on which least zeroth-order diffracted light is superimposed, an intensity of zeroth-order diffracted light can be more accurately removed.

An image generation method using digital holography in accordance with the present invention, includes the steps of: (a) generating a first hologram and a second hologram each obtained by extracting components identical in phase shift amount of a reference light beam from a polarizer array hologram which is recorded in a pixel of an image capturing device mounted with a polarizer array and includes two or more kinds of hologram information that differ in the phase shift amount; (b) dividing the first hologram into a plurality of first regions, and dividing the second hologram into a plurality of second regions in a second pattern identical to a first pattern in which the first hologram is divided into the plurality of first regions; (c) generating a group of a plurality of reconstructed images by calculation under a phase shift method and diffraction integration in accordance with the first hologram and the second hologram while changing a correction value for an intensity in at least one of a first region of the first hologram and a second region of the second hologram; and (d) selecting, from the group of the plurality of reconstructed images, a reconstructed image on which least zeroth-order diffracted light is superimposed, and finding the correction value for the reconstructed image thus selected.

Advantageous Effects of Invention

A digital holography device in accordance with the present invention includes: a comparing section for comparing a first average value of an intensity in a first region of the first hologram and a second average value of an intensity in a second region of the second hologram which region corresponds to the first region; and a correcting section for, in order that an intensity of zeroth-order diffracted light is accurately removed, correcting at least one of the first region of the first hologram and the second region of the second hologram that corresponds to the first region. Therefore, a ratio of zeroth-order diffracted light between the regions of each of the holograms can be 1:1, so that a subject can be measured with high accuracy in the entire surface of the image capturing device by correcting intensity unevenness by accurately removing zeroth-order diffracted light, which is an unnecessary image component.

BRIEF DESCRIPTION OF DRAWINGS

(a) of FIG. 3 shows transmission axes in respective cells of a polarizer array provided to the digital holography device. (b) of FIG. 3 shows a phase distribution of a reference light beam in the digital holography device.

(a) of FIG. 7 shows a hologram recorded by an image capturing device of the conventional digital holography device and ranges of pixels for use in image reconstruction. (b) of FIG. 7 shows zeroth-order diffracted light obtained in each of the ranges shown in (a) of FIG. 7.

DESCRIPTION OF EMBODIMENTS

Figure 1:
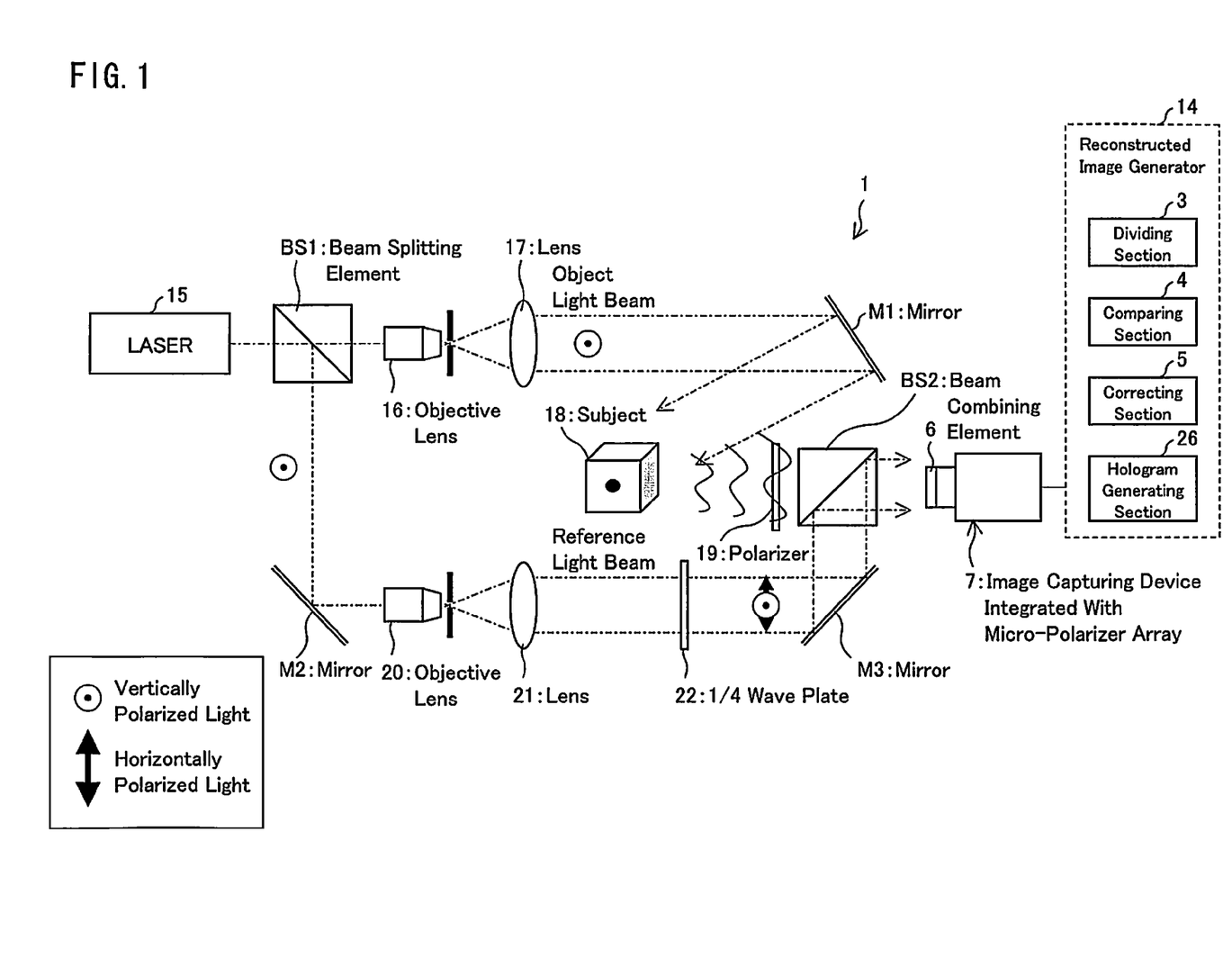
FIG. 1 schematically shows a configuration of a digital holography device in accordance with an embodiment of the present invention.

An embodiment of the present invention is specifically described below. FIG. 1 schematically shows a configuration of a digital holography device 1 in accordance with the embodiment of the present invention. The digital holography device 1 is a system for achieving parallel two-step phase shift digital holography. FIG. 1 shows an example of an optical system in which a polarizer array 6 is mounted on an image capturing surface of an image capturing device 7. The following description discusses the digital holography device 1 shown in FIG. 1. First, a laser to be emitted from a light source 15 contains only a vertically polarized light component. A beam splitting element BS1 splits light emitted from the light source 15 into an object light beam and a reference light beam.

The object light beam transmitted through the beam splitting element BS1 is transmitted through an objective lens 16 and a lens 17, reflected by a mirror M1, and then directed to a subject 18. Scattered light from the subject 18 passes through a polarizer 19 and then becomes vertically polarized light. Then, the scattered light passes through the polarizer array 6 via a beam combining element BS2 and then reaches the image capturing surface of the image capturing device 7.

Meanwhile, the reference light beam reflected by the beam splitting element BS1 is reflected by a mirror M2 and then passes through an objective lens 20 and a lens 21. Thereafter, when the reference light beam passes through a ¼ wave plate 22, the reference light beam becomes circularly polarized light containing a vertically polarized light component and a horizontally polarized light component. In this case, the reference light beam contains a component with no phase shift and a component with a phase shift of $-\pi/2$. Then, the reference light beam is reflected by a mirror M3, reflected by the beam combining element BS2, and then reaches the image capturing device 7 which is integrated with the polarizer array 6.

The object light beam and the reference light beam each having passed through the polarizer array 6 interfere with each other on the image capturing surface of the image capturing device 7. Phases of the reference light beam having passed through the polarizer array 6 spatially have two kinds of information, and are distributed in a checkered pattern. In a case where the reference light beam and the object light beam interfere with each other, an image of information on two kinds of holograms can be captured at one time.

The digital holography device 1 includes a reconstructed image generator 14. The reconstructed image generator 14 includes a hologram generating section 26, a dividing section 3, a comparing section 4, and a correcting section 5. The hologram generating section 26 generates a hologram 9 and a hologram 10 (each shown in FIG. 4) each obtained by extracting components identical in phase shift amount from a polarizer array hologram 8 (shown in FIG. 4). The dividing section 3 divides the hologram 9 into a plurality of regions 11 (shown in FIG. 9), and divides the hologram 10 into a plurality of regions 12 (shown in FIG. 9) in a second pattern identical to a first pattern in which the hologram 9 is divided into the plurality of regions 11. The comparing section 4 compares a first average value of an intensity in a region 11 of the hologram 9 and a second average value of an intensity in a corresponding region 12 of the hologram 10. In a case where the first average value and the second average value differ, the correcting section 5 corrects at least one of the first average value and the second average value so that an intensity of zeroth-order diffracted light is accurately removed.

Figure 2:
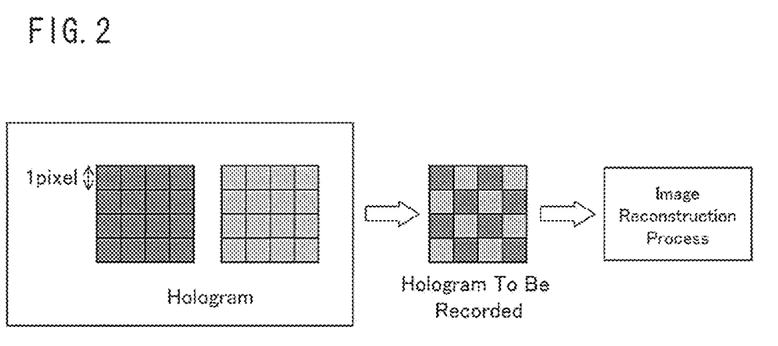
FIG. 2 illustrates a principle of parallel phase shift digital holography carried out by the digital holography device.

FIG. 2 illustrates a principle of parallel phase shift digital holography carried out by the digital holography device 1 which can achieve phase shift interference measurement by a single shot. The digital holography device 1 uses a single image capturing device 7 to record, by a single shot, information on a plurality of holograms necessary for a phase shift method. Then, the digital holography device 1 reconstructs a three-dimensional image of a subject by carrying out an image reconstruction process. FIG. 2 shows a principle of parallel two-step phase shift digital holography, which is parallel phase shift digital holography for obtaining two holograms by a single shot.

Figure 3:
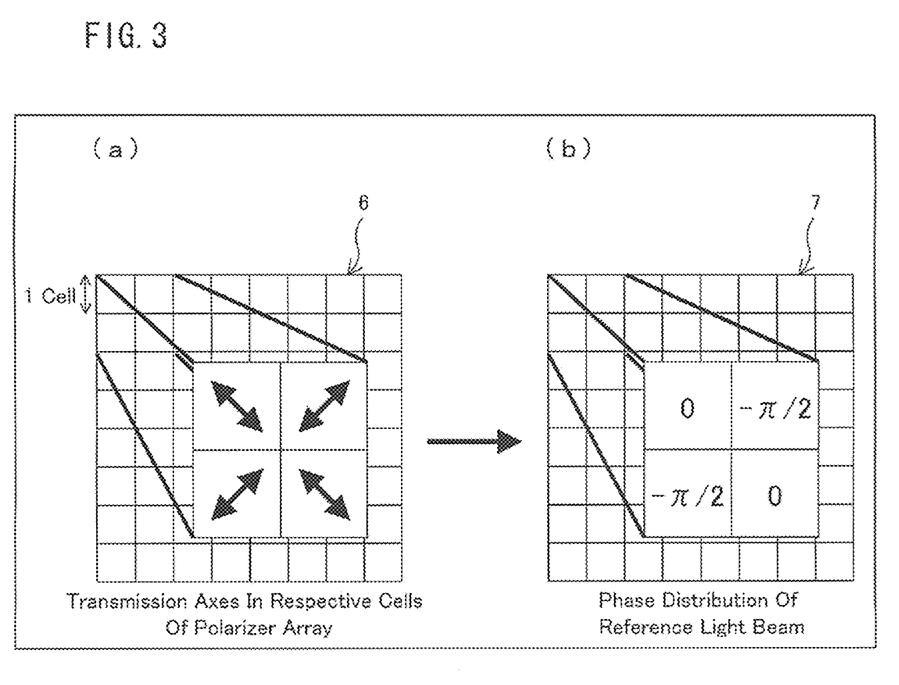

(a) of FIG. 3 shows transmission axes in respective cells of the polarizer array 6 provided to the digital holography device 1. (b) of FIG. 3 shows a phase distribution of a reference light beam in the digital holography device 1.

Arrows shown in (a) of FIG. 3 indicate that only light polarized in arrow directions shown in (a) of FIG. 3 can pass. A size of one block of the polarizer array 6 corresponds to a size of one pixel on the image capturing surface of the image capturing device 7. The polarizer array 6 is mounted on the image capturing surface of the image capturing device 7. The polarizer array 6 splits light emitted from the light source 15 into two kinds of reference light beams having different phases in a plane perpendicular to a direction in which the light travels. In a case where transmission axes in respective cells of the polarizer array 6 are configured as shown in (a) of FIG. 3, a reference light beam to be recorded in each pixel on the image capturing surface of the image capturing device 7 has a phase distribution in which a region with no phase shift and a region with a phase shift of $-\pi/2$ are alternately arranged (see (b) of FIG. 3). Therefore, the polarizer array hologram 8 (shown in FIG. 4) including information on two kinds of holograms which differ in phase shift amount of a reference light beam can be obtained by the polarizer array 6 by a single recording.

Figure 4:
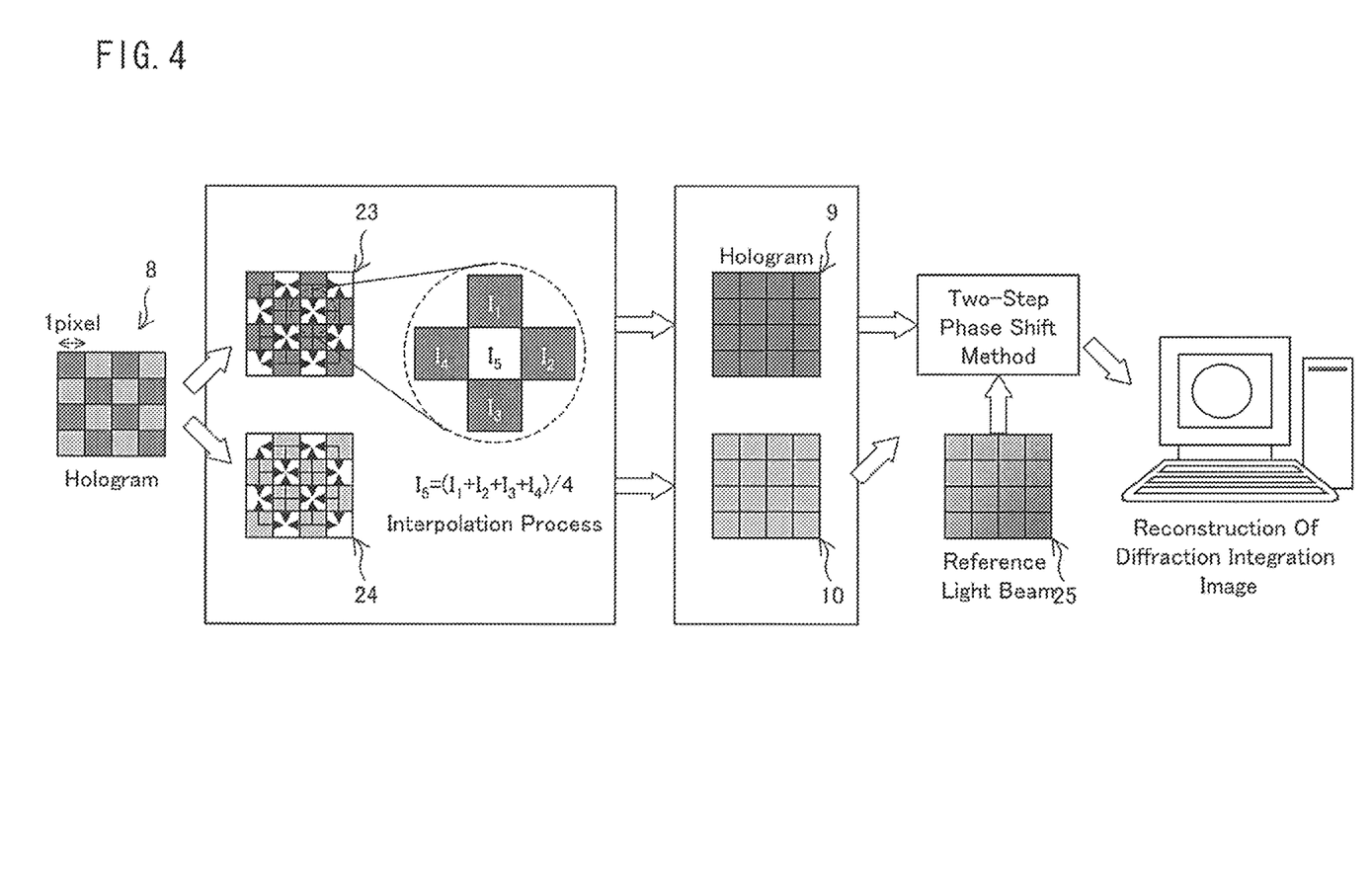
FIG. 4 illustrates an algorithm for image reconstruction by the digital holography device.

FIG. 4 illustrates an algorithm for image reconstruction by the digital holography device 1. The hologram generating section 26 provided in the reconstructed image generator 14 of the digital holography device 1 extracts, from one polarizer array hologram 8 recorded on the image capturing surface of the image capturing device 7, a hologram 23 and a hologram 24 each indicating information on interference fringes which are identical in phase shift amount of a reference light beam. Next, two holograms 9 and 10 are each obtained by subjecting a lacking pixel $I_5$ in each of the hologram 23 and the hologram 24 to an interpolation process by use of pixels $I_1$, $I_2$, $I_3$, and $I_4$, which are adjacent to the lacking pixel $I_5$. Then, the holograms 9 and 10 thus obtained are used to carry out a calculation process by a two-step phase shift method. Thereafter, a reconstructed image is obtained by carrying out diffraction calculation with respect to a complex amplitude of the subject 18 which complex amplitude has been obtained by calculation.

Figure 5:
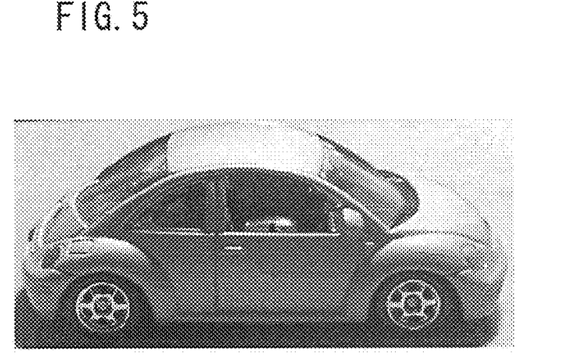
FIG. 5 is a photograph showing a subject whose image is captured by the digital holography device.

FIG. 5 is a photograph showing a subject whose image is captured by the digital holography device. An experiment was carried out by use of an optical system shown in FIG. 1. FIG. 5 shows a subject used in the experiment. The subject is a miniature model of a car. A solid laser having a wavelength of 532 nm was used as the light source 15. A CCD camera provided with a polarizer array having 1164 (H)×874 (V) pixels was used as the image capturing device 7.

Figure 6:
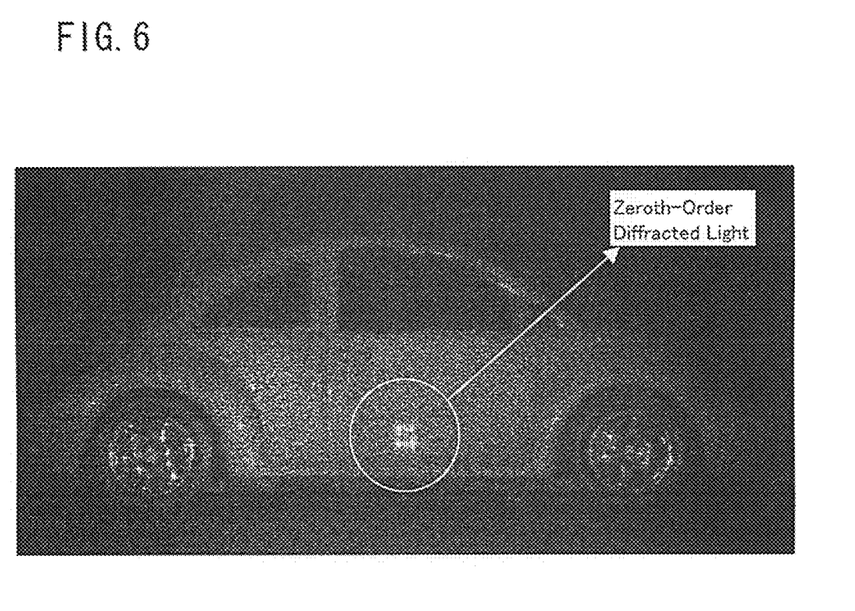
FIG. 6 is a photograph showing a reconstructed image of a subject which image has been obtained by a conventional digital holography device.

FIG. 6 shows a reconstructed image obtained by the experiment. According to the reconstructed image, zeroth-order diffracted light, which is an unnecessary image component, has been superimposed on a desired image of the miniature model of the car.

Figure 7:
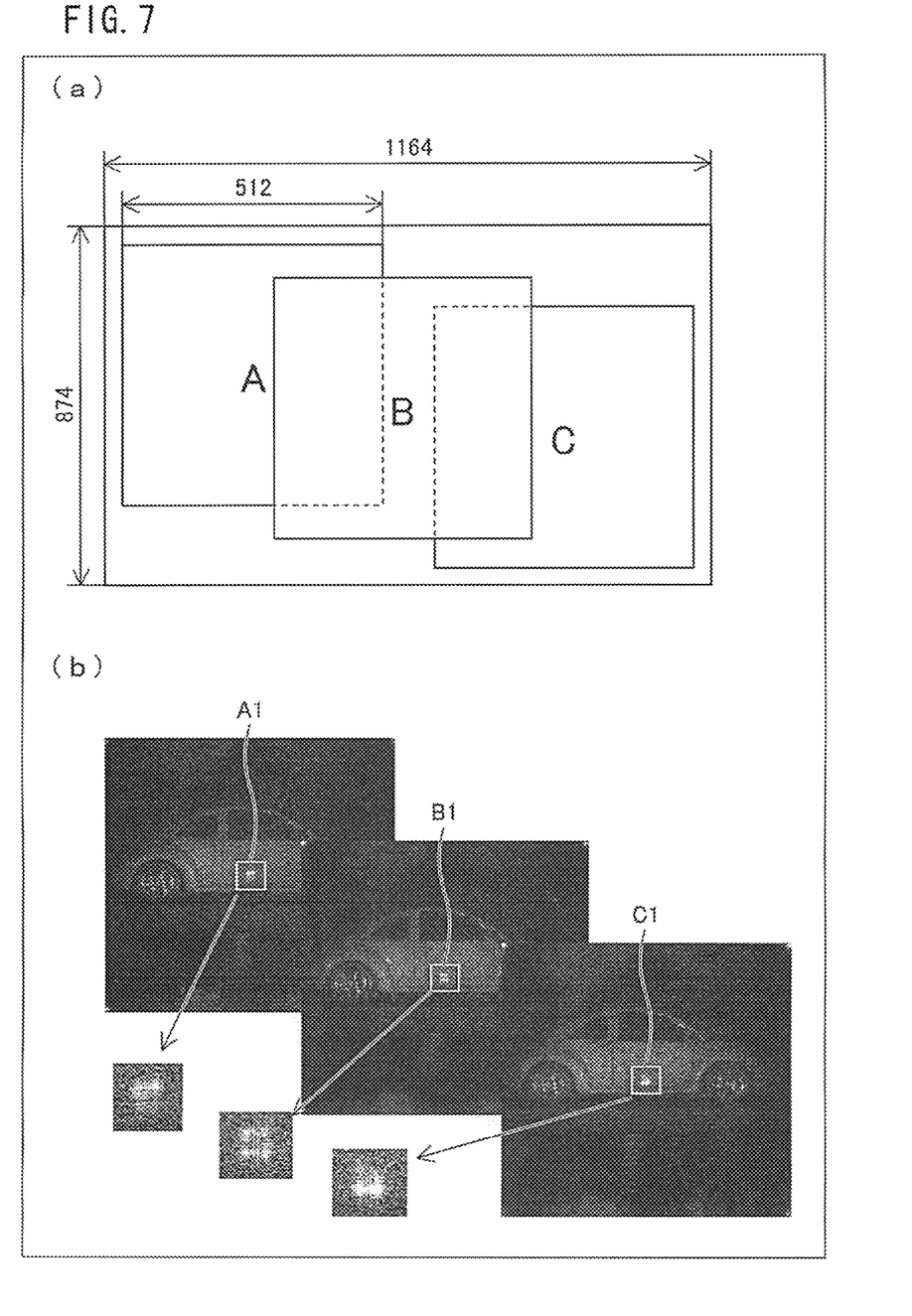

(a) of FIG. 7 shows a hologram recorded by an image capturing device of a conventional digital holography device and ranges of pixels for use in image reconstruction. (b) of FIG. 7 shows zeroth-order diffracted light obtained in each of the ranges shown in (a) of FIG. 7.

The following description discusses a relationship between a range of a hologram for use in image reconstruction and zeroth-order diffracted light. Digital holography makes it possible to carry out an image reconstruction process by use of a part of an electronically recorded hologram. (a) of FIG. 7 shows (i) an electronic hologram of 1164×874 pixels which electronic hologram has been recorded by the image capturing device and (ii) ranges of pixels for use in image reconstruction. (b) of FIG. 7 shows, from the left, results obtained by carrying out image reconstruction by use of 512×512 pixels with respect to the ranges indicated by respective signs A, B, and C in (a) of FIG. 7. Regions A1, B1, and C1 each surrounded on four sides and respective enlarged views of the regions A1, B1, and C1 each show zeroth-order diffracted light.

Zeroth-order diffracted light is superimposed on each of reconstructed images. However, in a case where the enlarged views are observed, zeroth-order diffracted light is partially removed. Further, in a case where the ranges of the pixels for use in image reconstruction are changed, a state of the removal and the superimposition has changed. The above description reveals that a change in range of a hologram for use in image reconstruction changed how zeroth-order diffracted light appeared.

Conventional parallel phase shift digital holography achieves both extraction of only an image of a subject and instantaneous measurement. However, an image quality deteriorates due to imperfect removal of zeroth-order diffracted light (see FIG. 6 and FIG. 7). Further, the change in range of a hologram for use in image reconstruction changed how zeroth-order diffracted light appeared. A reason for this is described below.

First, according to a phase shift method, unless an intensity of zeroth-order diffracted light is constant in a plurality of holograms obtained, an unnecessary image component cannot be perfectly removed. In view of this, according to parallel phase shift digital holography, an optical system is adjusted so that an intensity of zeroth-order diffracted light is constant.

However, it is difficult to cause an intensity of zeroth-order diffracted light to be constant on an entire surface of an image capturing device. Even if it is possible to cause an intensity of zeroth-order diffracted light to be constant in a part of the image capturing device, intensity unevenness occurs in the other parts of the image capturing device.

As a result, according to a conventional image reconstruction process, zeroth-order diffracted light, which cannot be perfectly removed, remains. (b) of FIG. 7 shows a case where it was possible to cause an intensity of zeroth-order diffracted light to be constant in only a part of an image capturing surface of an image capturing device and intensity unevenness occurred in the other parts of the image capturing surface of the image capturing device.

Figure 8:
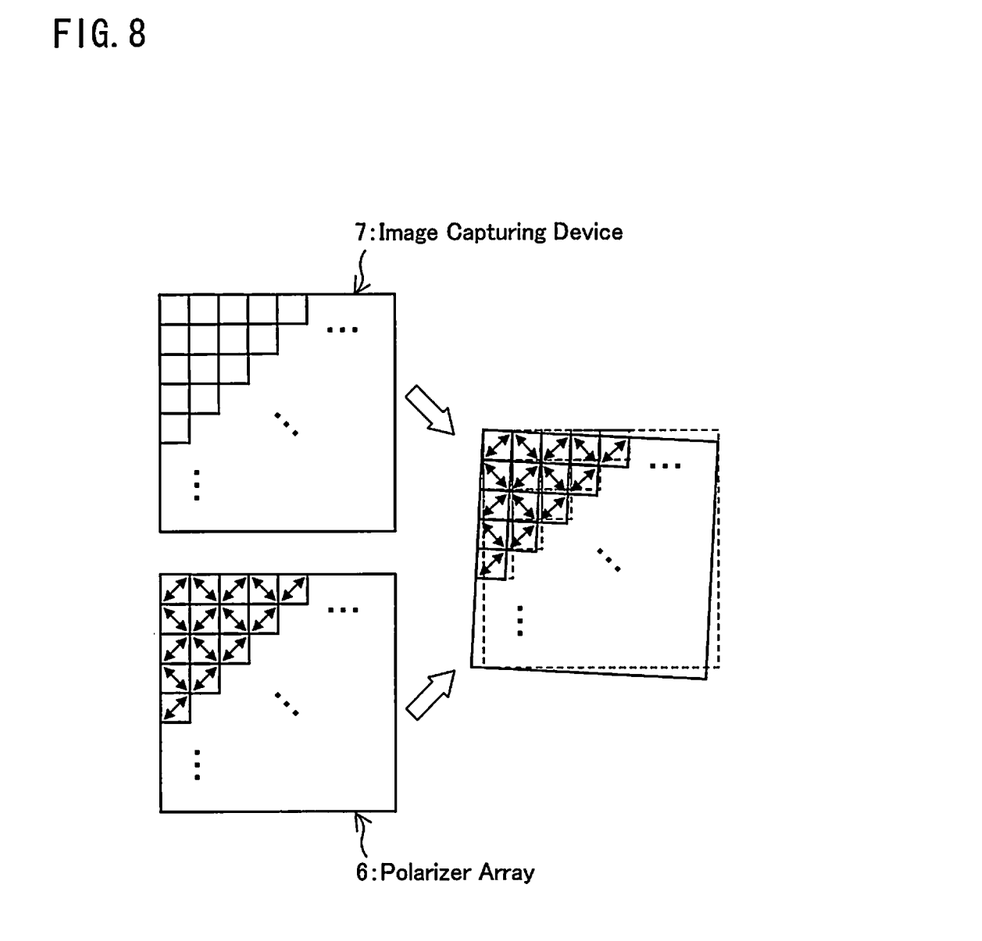
FIG. 8 illustrates a positioning error that occurs during mounting of a polarizer array on an image capturing device.

FIG. 8 illustrates a positioning error that occurs during mounting of a polarizer array on an image capturing device. The reason why it is difficult to cause an intensity of zeroth-order diffracted light to be constant is partly because of a positioning error that occurs during mounting of each cell of an array of micro-optical elements on each pixel of an image capturing device.

Namely, intensity unevenness occurs due to a positioning error that occurs during mounting of each cell of the polarizer array 6 of micro-optical elements on each pixel of the image capturing device 7. That is, in a case where an object light beam and a reference light beam are unequal in intensity on their respective transmission axes, an unnecessary image component cannot be perfectly removed during an image reconstruction process. Such a problem is inevitable in terms of a structure of a digital holography device and a technique for producing the digital holography device.

A problem of such intensity unevenness can be solved by, for example, more accurately mounting each cell of the polarizer array 6 on each pixel of the image capturing device 7. However, each cell and each pixel, whose sizes have recently been micron orders, are required to be positioned with extremely high accuracy. A recent improvement in production technique has achieved positioning of the polarizer array 6. However, it is extremely difficult to position each cell of the polarizer array 6 of optical elements and each pixel of the image capturing device 7 in a perfectly one-to-one correspondence.

In view of the circumstances, in order to solve the problem of intensity unevenness by image processing, the inventors of the present invention invented an algorithm for removal of zeroth-order diffracted light. The present algorithm is effective for causes of an occurrence of intensity unevenness such as a positioning error that occurs during mounting of the polarizer array 6 on the image capturing device 7, an error in adjustment of an optical system, a difference in light receiving sensitivity for each pixel of an image capturing device, a dark electric current, and other incidental changes in pixel value.

Figure 9:
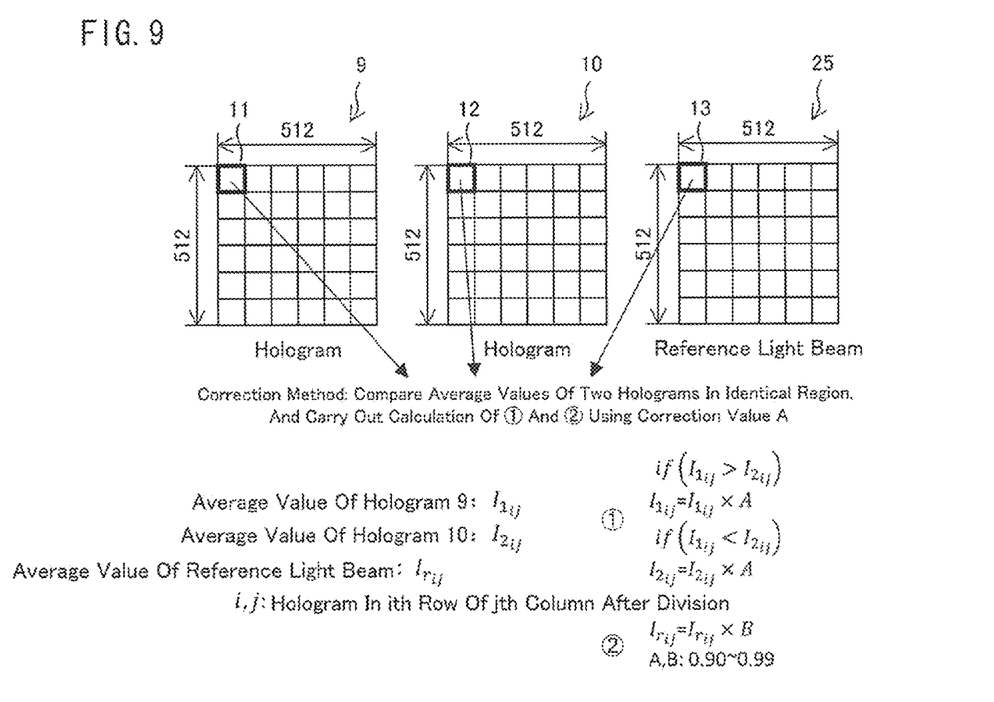
FIG. 9 illustrates a method in which the digital holography device in accordance with the embodiment of the present invention corrects an intensity in a region of a hologram.

FIG. 9 illustrates a method in which the digital holography device 1 corrects an intensity in a region of a hologram.

Given that it is impossible to accurately calculate and remove zeroth-order diffracted light due to a variation in intensity of zeroth-order diffracted light in a plurality of kinds of holograms, variation in intensity of zeroth-order diffracted light is corrected by correcting intensity unevenness. Further, a change in correction value for intensity unevenness for each region of a hologram causes an intensity of zeroth-order diffracted light to be constant in the entire image capturing surface of the image capturing device 7.

First, the dividing section 3 of the reconstructed image generator 14 divides the hologram 9 into 36 regions 11 (arranged in 6 rows and 6 columns), and divides the hologram 10 divides the hologram 10 into regions 12 (arranged in 6 rows and 6 columns) in a second pattern identical to a first pattern in which the hologram 9 is divided (see FIG. 9). Further, the dividing section 3 divides a reference light beam 25 into 36 regions 13 (arranged in 6 rows and 6 columns).

Note that a manner of the division shown in FIG. 9 serves as an example and the present invention is not limited to this. The number of regions obtained by the division may be larger or smaller than 36. Each of the holograms and the reference light beam may be divided into 16 regions (arranged in 4 rows and 4 columns) or into 64 regions (arranged in 8 rows and 8 columns). Further, the regions obtained by the division do not need to be arranged in a matrix pattern. For example, in a case where intensity unevenness appears in random regions, without the need of dividing each of the holograms and the reference light beam in rows and columns, the present invention is applicable also to division into variously random regions by, for example, applying an algorithm in accordance with the embodiment of the present invention only to a place where intensity unevenness occurs.

As described above, the two holograms 9 and 10 obtained after the interpolation process and the reference light beam 25 are each divided into a plurality of regions, and the plurality of regions are each corrected.

Then, the comparing section 4 of the reconstructed image generator 14 compares a first average value of an intensity in a region 11 of the hologram 9 and a second average value of an intensity in a corresponding region 12 of the hologram 10. That is, the comparing section 4 calculates and compares average values of the regions 11 and 12 corresponding to the respective two holograms 9 and 10 obtained after the interpolation process.

Next, in a case where the first average value of the intensity in the region 11 of the hologram 9 is greater than the second average value of the intensity in the corresponding region 12 of the hologram 10, the correcting section 5 corrects the first average value so that the first average value and the second average value are equal. Namely, a correction value A is given to one of the average values which is larger as a result of the comparison. Calculation for the correction is carried out by the following method.

[Math. 1]

In a case where $\overline{I_{1\_ij}} > \overline{I_{2\_ij}}$, $$I_{1\_ij\_hosei} = I_{1\_ij} \times A \quad \text{(Equation 1)}$$

In a case where $\overline{I_{1\_ij}} > \overline{I_{2\_ij}}$, $$I_{2\_ij\_hosei} = I_{2\_ij} \times A \quad \text{(Equation 2)}$$

$\overline{I_{1\_ij}}$: Average value of intensity in region 11 of hologram 9
$\overline{I_{2\_ij}}$: Average value of intensity in region 12 of hologram 10
$I_{1\_ij}$: Intensity in region 11 of hologram 9 before correction
$I_{2\_ij}$: Intensity in region 12 of hologram 10 before correction
$I_{1\_ij\_hosei}$: Intensity in region 11 of hologram 9 after correction
$I_{2\_ij\_hosei}$: Intensity in region 12 of hologram 10 after correction where the correction value A is approximately 0.90 to 0.99 in this experimentation.

Note that the embodiment of the present invention has shown an example in which, in a case where the first average value of the intensity in the region 11 of the hologram 9 is greater than the second average value of the intensity in the corresponding region 12 of the hologram 10, the intensity in the region 11 of the hologram 9 is corrected so that the first average value and the second average value are equal. However, the present invention is not limited to this. The region 12 of the hologram 10 which region corresponds to the region 11 may be corrected so that the first average value and the second average value are equal. Alternatively, both the region 11 of the hologram 9 and the region 12 of the hologram 10 which region corresponds to the region 11 may be corrected.

Note that the present embodiment has shown an example in which the correction is carried out so that the first average value and the second average value are equal. However, the present invention is not limited to this. It is only necessary that at least one of the intensity in the region 11 of the hologram 9 and the intensity in the region 12 of the hologram 10 which region corresponds to the region 11 be corrected so that an intensity of zeroth-order diffracted light is accurately removed. As described above, even if the first average value and the second average value are not exactly equal, an effect of the present invention is yielded by carrying out the correction so that an intensity of zeroth-order diffracted light is accurately removed.

A correction value B is given to an intensity of a reference light beam. Calculation for the correction is carried out by the following method.

[Math. 2]

$$I_{r\_ij\_hosei} = I_{r\_ij} \times B \quad \text{(Equation 3)}$$

where Ir_ij indicates an average value of intensity in a region 13 of the reference light beam 25, and Ir_ij_hosei indicates an intensity in the region 13 of the reference light beam 25 after the correction, and the correction value B is approximately 0.90 to 0.99 in this experimentation. An intensity is thus adjusted for each region so that zeroth-order diffracted light is removed. The correction value B can be calculated based on, for example, an intensity of a reference light beam which intensity is measured in advance.

Figure 10:
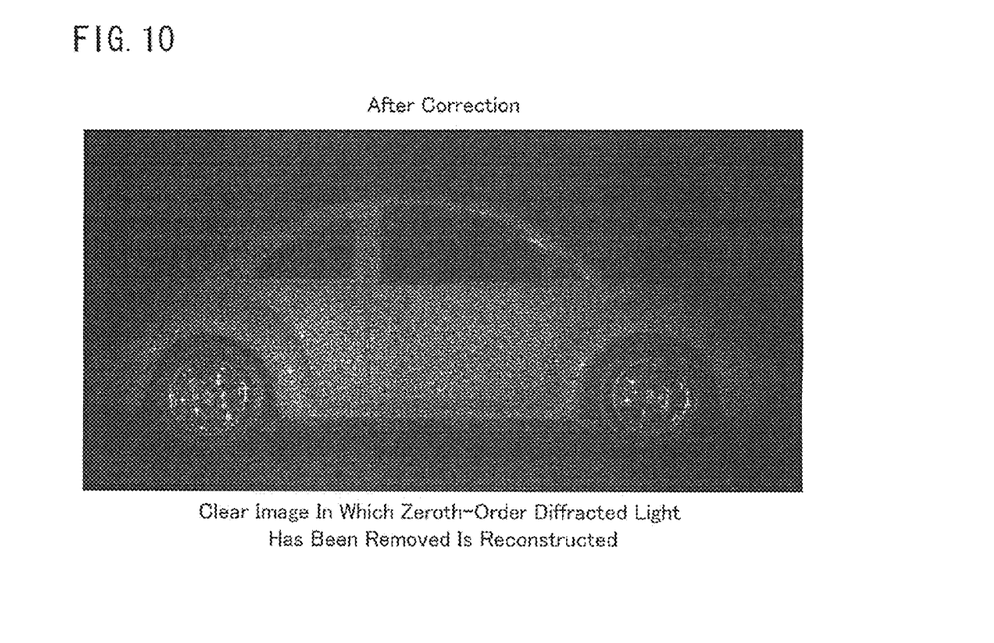
FIG. 10 is a photograph showing a reconstructed image of a subject which image has been obtained by the digital holography device in accordance with the embodiment of the present invention.

According to a reconstructed image generated based on the algorithm for removal of zeroth-order diffracted light in accordance with the embodiment of the present invention, a clear image in which zeroth-order diffracted light has been removed is reconstructed (see FIG. 10).

Figure 11:
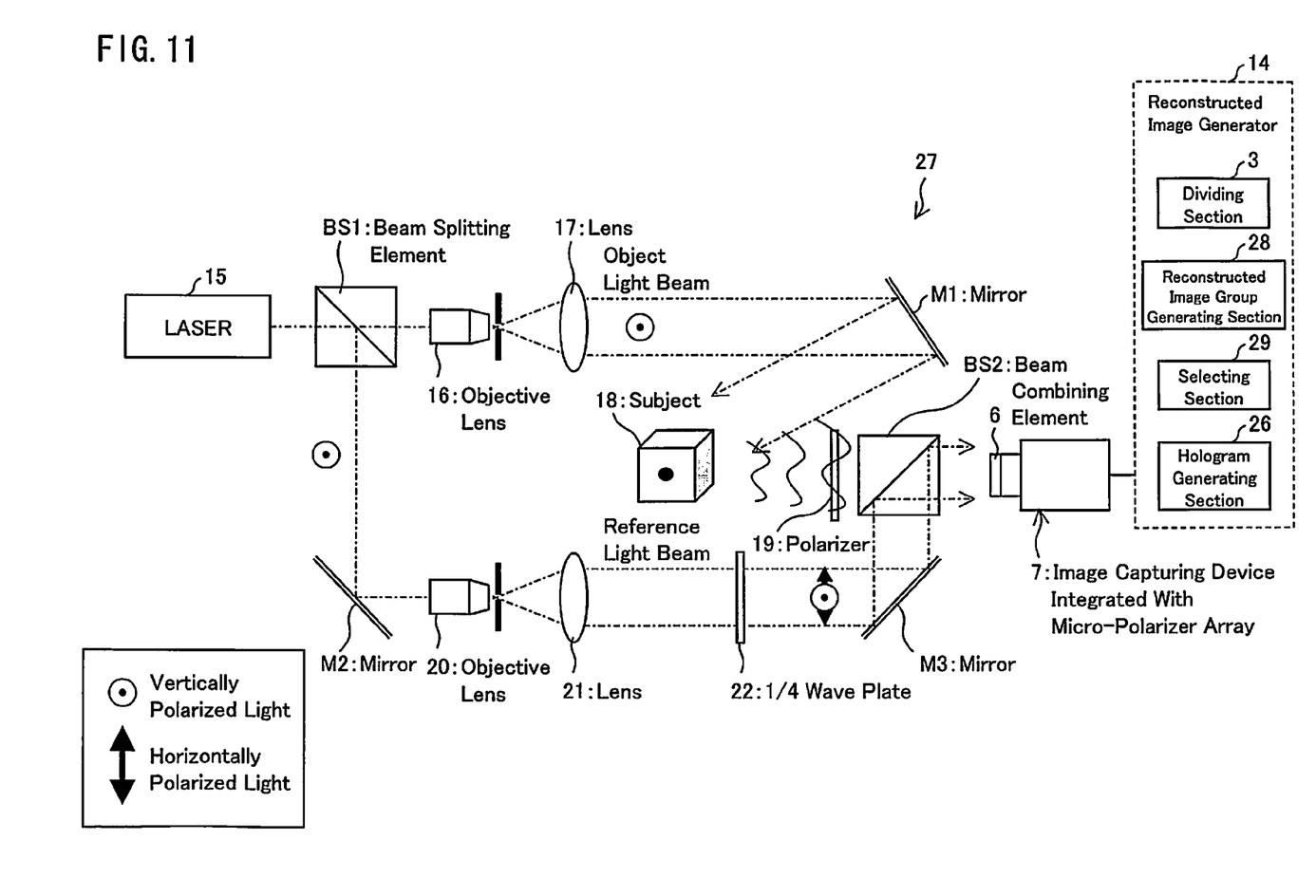
FIG. 11 schematically shows a configuration of another digital holography device in accordance with the embodiment of the present invention.

FIG. 11 schematically shows a configuration of a digital holography device 27 in accordance with the embodiment of the present invention. Members identical to those described earlier are given respective identical reference numerals, and a specific description of those members is omitted here. The digital holography device 27 includes the reconstructed image generator 14. The reconstructed image generator 14 includes the hologram generating section 26, the dividing section 3, a reconstructed image group generating section 28, and a selecting section 29.

According to the digital holography device 27 in accordance with the embodiment of the present invention, a reconstructed image may be obtained by calculation under a phase shift method and diffraction integration without (i) comparing the first average value and the second average value and (ii) correcting at least one of or both the region 11 of the hologram 9 and the region 12 of the hologram 10 which region corresponds to the region 11.

Namely, a group of reconstructed images is obtained by reconstructing an image while changing a correction value for at least one of the region 11 and the region 12. Then, an optimal correction value for at least one of the region 11 and the region 12 which region corresponds to the region 11, at which optimal correction value least zeroth-order diffracted light is superimposed on a reconstructed image, is found by comparison of superimposition of zeroth-order diffracted light in the group of reconstructed images. Similarly, zeroth-order diffracted light may be accurately removed by correcting intensity unevenness by finding an optimal correction value for each of the region 11 and the region 12.

Such a method is a method for more accurately removing an intensity of zeroth-order diffracted light by spending more time and effort than the method shown in FIG. 9 for comparing the average values. The intensity of zeroth-order diffracted light is more accurately removed in accordance with the following processes:

(1) First, a process until image reconstruction is repeatedly carried out while a correction value for a given region (e.g., a region in the first row of the first column) is being changed.

(2) Then, a plurality of reconstructed images obtained are compared, a reconstructed image on which least zeroth-order diffracted light is superimposed is selected, and a correction value corresponding to the selected reconstructed image is employed.

(3) The processes described in (1) and (2) are similarly carried out with respect to all the regions, so that in each of the regions, the intensity of zeroth-order diffracted light is more accurately removed by employing a correction value corresponding to a reconstructed image on which least zeroth-order diffracted light is superimposed.

From the fact that a value of pixels (see FIG. 7) which appear when the intensity of zeroth-order diffracted light is superimposed on a reconstructed image is small, it can be determined, as described in the above (2), that superimposition of zeroth-order diffracted light less occurs. The above method, which requires more time than the method described earlier in the embodiment of the present invention, allows the intensity of zeroth-order diffracted light to be more accurately removed.

The hologram generating section 26 generates the hologram 9 and the hologram 10 each obtained by extracting components identical in phase shift amount of a reference light beam from the polarizer array hologram 8 which is recorded in a pixel of the image capturing device 7 mounted with the polarizer array 6 and includes two or more kinds of hologram information that differ in the phase shift amount.

The dividing section 3 divides the hologram 9 into a plurality of regions 11, and divides the hologram 10 into a plurality of regions 12 in a second pattern identical to a first pattern in which the hologram 9 is divided into the plurality of regions 11.

The reconstructed image group generating section 28 generates a group of a plurality of reconstructed images by calculation under a phase shift method and diffraction integration in accordance with the holograms 9 and 10 while changing a correction value for an intensity in at least one of a region 11 of the hologram 9 and a region 12 of the hologram 10.

The selecting section 29 selects, from the group of the plurality of reconstructed images, a reconstructed image on which least zeroth-order diffracted light is superimposed, and finds the correction value for the reconstructed image thus selected.

Note that the embodiment of the present invention has discussed an example of a polarizer array hologram including two kinds of hologram information. However, the present invention is not limited to this. The present invention is also applicable to a polarizer array hologram including three or more kinds of hologram information. For example, the present invention is applicable to a hologram including four kinds of hologram information.

As described earlier, the inventors of the present invention proposed an algorithm for intensity correction in phase shift digital holography, and confirmed effectiveness of the algorithm by carrying out the experiment. The present algorithm for intensity correction is applicable regardless of the number of phases of a phase shift in phase shift digital holography. The present algorithm for intensity correction allows high-quality imaging in parallel phase shift digital holography.

As described earlier, in a case where a micro-polarizer array of parallel phase shift digital holography is used, the present algorithm for intensity correction allows highly accurate three-dimensional measurement by accurately removing an unnecessary image component. In the case where a micro-polarizer array is used, an image capturing device which includes a pixel on which a block of the micro-polarizer array is mounted is used, and intensity unevenness occurs due to positional displacement that occurs during the mounting. Further, also in another case, intensity unevenness occurs due to, for example, an adjustment accuracy of an optical system and a dark electric current of an image capturing device. Occurrence of intensity unevenness prevents accurate calculation for removal of zeroth-order diffracted light, which is an unnecessary image component, so that an image quality deteriorates. The inventors of the present invention found that intensity unevenness occurred in an amount which varied for each part of a hologram, and the inventors paid their attention to the finding. Then, the inventors invented an algorithm for correcting intensity unevenness for carrying out highly accurate measurement by accurately removing zeroth-order diffracted light. The present algorithm for intensity correction is used to carry out intensity correction with respect to a hologram obtained after an interpolation process and an intensity of a reference light beam.

The digital holography device in accordance with the embodiment of the present invention is preferably arranged such that, in a case where the first average value is greater than the second average value, in order that an intensity of zeroth-order diffracted light is accurately removed, the intensity in the first region of the first hologram is corrected for a rough-surfaced object or a strongly scattering object, and the intensity in the first region of the first hologram or the second region of the second hologram which region corresponds to the first region is corrected for a weakly scattering object or a transparent object.

According to the configuration, in a case where the first average value is greater than the second average value, a ratio of zeroth-order diffracted light between the regions of each of the holograms can be 1:1 by a simple configuration such that the intensity in the first region of the first hologram is corrected to be reduced.

The digital holography device in accordance with the embodiment of the present invention is preferably arranged such that: the dividing section divides a reference light beam into a plurality of reference light beam regions in a third pattern identical to the first pattern in which the first hologram is divided into the plurality of first regions; and in a case where the first average value is greater than the second average value, the correcting section corrects a reference light beam region that corresponds to the first region. Note that both the plurality of first regions and the plurality of second regions may be corrected.

According to the configuration, also for a reference light beam, it is possible to correct intensity unevenness by accurately removing zeroth-order diffracted light.

The digital holography device in accordance with the embodiment of the present invention is preferably arranged such that the plurality of first regions into which the first hologram is divided by the dividing section are arranged in a matrix pattern.

According to the configuration, the first average value of the intensity in the first region of the first hologram and the second average value of the intensity in the second region of the second hologram which region corresponds to the first region can be compared by a simple configuration.

The digital holography device in accordance with the embodiment of the present invention is preferably arranged such that the plurality of first regions into which the first hologram is divided by the dividing section are arranged in six rows and six columns with respect to a 512- by 512-pixel hologram.

According to the configuration, the first average value of the intensity in the first region of the first hologram and the second average value of the intensity in the second region of the second hologram which region corresponds to the first region can be compared by a comparatively small amount of calculation.

The present invention is not limited to the description of the embodiments above, but may be altered by a skilled person within the scope of the claims. An embodiment based on a proper combination of technical means disclosed in different embodiments is encompassed in the technical scope of the present invention.

Industrial Applicability

The present invention is applicable to a digital holography device and digital holography in each of which a reconstructed image of a subject is generated in accordance with a first hologram and a second hologram each obtained by extracting components identical in phase shift amount from a polarizer array hologram.

Reference Signs List

1 Digital holography device
3 Dividing section
4 Comparing section
5 Correcting section
6 Polarizer array
7 Image capturing device
8 Polarizer array hologram
9, 10 Hologram
11 Region
12 Region
13 Region
14 Reconstructed image generator
15 Light source
16 Objective lens
17 Lens
18 Subject
19 Polarizer
20 Objective lens
21 Lens
22 ¼ wave plate
23, 24 Hologram
23, 24 Hologram
27 Digital holography device
28 Reconstructed image group generating section
29 Selecting section
BS1 Beam splitting element
BS2 Beam combining element
M1, M2, M3 Mirror

The invention claimed is:

1. A digital holography device comprising:
a hologram generating section for generating a first hologram and a second hologram each obtained by extracting components identical in phase shift amount of a reference light beam from a polarizer array hologram which is recorded in a pixel of an image capturing device mounted with a polarizer array and includes two or more kinds of hologram information that differ in the phase shift amount;
a dividing section for dividing the first hologram into a plurality of first regions, and dividing the second hologram into a plurality of second regions in a second pattern identical to a first pattern in which the first hologram is divided into the plurality of first regions;
a comparing section for comparing a first average value of an intensity in a first region of the first hologram and a second average value of an intensity in a second region of the second hologram which region corresponds to the first region; and
a correcting section for, in a case where the first average value and the second average value differ, in order that an intensity of zeroth-order diffracted light is accurately removed, correcting at least one of the intensity in the first region of the first hologram and the intensity in the second region of the second hologram which region corresponds to the first region.

2. The digital holography device as set forth in claim 1, wherein, in a case where the first average value is greater than the second average value, the correcting section corrects the intensity in the first region of the first hologram so that the intensity of zeroth-order diffracted light is accurately removed.

3. The digital holography device as set forth in claim 1, wherein:
the dividing section divides a reference light beam into a plurality of reference light beam regions in a third pattern identical to the first pattern in which the first hologram is divided into the plurality of first regions; and
in a case where the first average value is greater than the second average value, the correcting section corrects an intensity in a reference light beam region that corresponds to at least one of the first region and the second region that corresponds to the first region.

4. The digital holography device as set forth in claim 1, wherein the plurality of first regions into which the first hologram is divided by the dividing section are arranged in a matrix pattern.

5. The digital holography device as set forth in claim 1, wherein the plurality of first regions into which the first hologram is divided by the dividing section are arranged in six rows and six columns with respect to a 512- by 512-pixel hologram.

6. An image generation method using digital holography, comprising the steps of:
(a) generating a first hologram and a second hologram each obtained by extracting components identical in phase shift amount of a reference light beam from a polarizer array hologram which is recorded in a pixel of an image capturing device mounted with a polarizer array and includes two or more kinds of hologram information that differ in the phase shift amount;
(b) dividing the first hologram into a plurality of first regions, and dividing the second hologram into a plurality of second regions in a second pattern identical to a first pattern in which the first hologram is divided into the plurality of first regions;
(c) comparing a first average value of an intensity in a first region of the first hologram and a second average value of an intensity in a second region of the second hologram which region corresponds to the first region; and
(d) in a case where the first average value and the second average value differ, in order that an intensity of zeroth-order diffracted light is accurately removed, correcting at least one of the intensity in the first region of the first hologram and the intensity in the second region of the second hologram which region corresponds to the first region.

7. A digital holography device comprising:
a hologram generating section for generating a first hologram and a second hologram each obtained by extracting components identical in phase shift amount of a reference light beam from a polarizer array hologram which is recorded in a pixel of an image capturing device mounted with a polarizer array and includes two or more kinds of hologram information that differ in the phase shift amount;
a dividing section for dividing the first hologram into a plurality of first regions, and dividing the second hologram into a plurality of second regions in a second pattern identical to a first pattern in which the first hologram is divided into the plurality of first regions;

a reconstructed image group generating section for generating a group of a plurality of reconstructed images by calculation under a phase shift method and diffraction integration in accordance with the first hologram and the second hologram while changing a correction value for an intensity in at least one of a first region of the first hologram and a second region of the second hologram; and a selecting section for selecting, from the group of the plurality of reconstructed images, a reconstructed image on which least zeroth-order diffracted light is superimposed, and finding the correction value for the reconstructed image thus selected.

8. An image generation method using digital holography, comprising the steps of:
   (a) generating a first hologram and a second hologram each obtained by extracting components identical in phase shift amount of a reference light beam from a polarizer array hologram which is recorded in a pixel of an image capturing device mounted with a polarizer array and includes two or more kinds of hologram information that differ in the phase shift amount;
   (b) dividing the first hologram into a plurality of first regions, and dividing the second hologram into a plurality of second regions in a second pattern identical to a first pattern in which the first hologram is divided into the plurality of first regions;
   (c) generating a group of a plurality of reconstructed images by calculation under a phase shift method and diffraction integration in accordance with the first hologram and the second hologram while changing a correction value for an intensity in at least one of a first region of the first hologram and a second region of the second hologram; and
   (d) selecting, from the group of the plurality of reconstructed images, a reconstructed image on which least zeroth-order diffracted light is superimposed, and finding the correction value for the reconstructed image thus selected.

* * * * *